United States Patent
Horiike et al.

(10) Patent No.: US 9,758,037 B2
(45) Date of Patent: Sep. 12, 2017

(54) CONTROL SYSTEM FOR FOUR-WHEEL DRIVE VEHICLE

(71) Applicant: TOYOTA JIDOSHA KABUSHIKI KAISHA, Toyota-shi, Aichi-ken (JP)

(72) Inventors: Kohei Horiike, Toyota (JP); Kunihiro Iwatsuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 14/915,715

(22) PCT Filed: Aug. 29, 2014

(86) PCT No.: PCT/IB2014/001636
§ 371 (c)(1),
(2) Date: Mar. 1, 2016

(87) PCT Pub. No.: WO2015/028874
PCT Pub. Date: Mar. 5, 2015

(65) Prior Publication Data
US 2016/0193917 A1  Jul. 7, 2016

(30) Foreign Application Priority Data
Sep. 2, 2013  (JP) ................. 2013-181048

(51) Int. Cl.
*B60K 17/35* (2006.01)
*B60K 23/08* (2006.01)
*F16D 48/06* (2006.01)
*B60W 10/119* (2012.01)

(52) U.S. Cl.
CPC .............. *B60K 23/08* (2013.01); *B60K 17/35* (2013.01); *B60K 17/3515* (2013.01); (Continued)

(58) Field of Classification Search
CPC .......... F16D 2500/10431; B60K 23/08; B60K 17/35; B60K 2023/0858; B60K 23/0808; (Continued)

(56) References Cited

U.S. PATENT DOCUMENTS 6,016,883 A    1/2000  Yamada
9,187,075 B2 * 11/2015  Grain .................... B60W 10/06
(Continued)

FOREIGN PATENT DOCUMENTS

JP    S60-30433 A     2/1985
JP    H01-106133 A    4/1989
(Continued)

OTHER PUBLICATIONS

Partial Translation of Oct. 6, 2015 Office Action issued in Japanese Patent Application No. 2013-181048.

*Primary Examiner* — Roger Pang
(74) *Attorney, Agent, or Firm* — Oliff PLC

(57) ABSTRACT

Even in the case where it is difficult to increase an engine torque (Te) during switching when a running is switched to a 4WD running or a 2WD running during a 2WD_d running, an alternative control section suppresses a fluctuation in the driving force of a four-wheel drive vehicle, hence it is possible to suppress a switching shock and an unnatural feeling of deceleration occurring during the switching to the 4WD running or the 2WD running.

10 Claims, 9 Drawing Sheets

(52) U.S. Cl.
CPC .......... *F16D 48/06* (2013.01); *B60K 23/0808* (2013.01); *B60K 2023/0858* (2013.01); *B60W 10/119* (2013.01); *F16D 2500/10431* (2013.01); *Y10T 477/68* (2015.01); *Y10T 477/689* (2015.01)

(58) Field of Classification Search
CPC ............ Y10T 477/68; Y10T 477/9689; B60W 10/119
USPC ............................................... 701/54, 62, 69
See application file for complete search history.

(56) References Cited

U.S. PATENT DOCUMENTS

| | | | |
|---|---|---|---|
| 2007/0039770 A1* | 2/2007 | Barrette | B60W 10/06 180/197 |
| 2010/0094519 A1 | 4/2010 | Quehenberger et al. | |
| 2013/0220722 A1* | 8/2013 | Mita | B60K 17/34 180/249 |
| 2015/0298679 A1* | 10/2015 | Sugitani | B60K 6/48 701/22 |

FOREIGN PATENT DOCUMENTS

| | | |
|---|---|---|
| JP | S64-90825 A | 4/1989 |
| JP | H04-278833 A | 10/1992 |
| JP | H08-91075 A | 4/1996 |
| JP | H10-129297 A | 5/1998 |
| JP | 2010-100280 A | 5/2010 |

* cited by examiner

CONTROL SYSTEM FOR FOUR-WHEEL DRIVE VEHICLE

BACKGROUND OF THE INVENTION

1. Field of the Invention

The invention relates to control of a four-wheel drive (4WD) vehicle, and particularly relates to control of a 4WD vehicle including a disconnect mechanism that interrupts power transmission (T/M) to a specific rotary element.

2. Description of Related Art

A 4WD vehicle is available which includes an auxiliary drive wheel to which power is transmitted from an engine (E/G) during a 4WD running, and a disconnect mechanism that is provided in a power T/M path between the E/G and the auxiliary drive wheel and interrupts power T/M to a specific rotary element for transmitting the power to the auxiliary drive wheel to thereby stop the rotation of the specific rotary element. 4WD vehicles described in Japanese Patent Application Publication No. 2010-100280 (JP 2010-100280 A) and Japanese Patent Application Publication No. 60-30433 (JP 60-30433 A) are examples thereof.

In the 4WD vehicle of each of JP 2010-100280 A and JP 60-30433 A, when a specific condition is satisfied, by operating the disconnect mechanism, co-rotation of the specific rotary element is prevented and fuel efficiency is thereby improved.

Incidentally, when the operation of the disconnect mechanism is canceled during a two-wheel drive (2WD) running that involves the operation of the disconnect mechanism, specifically, when the 2WD running is switched to a 4WD running or a normal 2WD running, the interruption of the power T/M to the specific rotary element of which the co-rotation has been prevented is canceled, and hence rotational inertia caused by an increase in the speed of the specific rotary element is increased. In JP 60-30433 A, by increasing an E/G torque when the running is switched from the 2WD running involving the operation of the disconnect mechanism to the 4WD running (cancellation of the operation of the disconnect mechanism), the increase in the rotational inertia of the specific rotary element is canceled, and a switching shock and an unnatural feeling of deceleration occurring during the switching are suppressed.

SUMMARY OF THE INVENTION

However, in a control device for the 4WD vehicle of JP 60-30433 A, for example, when a communication abnormality occurs between an electronic control unit (ECU) that controls an E/G output (E/G-ECU) and an ECU that controls a drive state of the 4WD vehicle (4WD-ECU), it becomes difficult to increase the E/G torque when the running is switched from the 2WD running involving the operation of the disconnect mechanism to the 4WD running. In addition, when a throttle sensor or the like breaks down, it also becomes difficult to increase the E/G torque. In these cases, it becomes difficult to cancel the rotational inertia of the specific rotary element generated when the operation of the disconnect mechanism is canceled during the 2WD running involving the operation of the disconnect mechanism by using the E/G torque, and hence there is a possibility that the switching shock and the unnatural feeling of deceleration occur when the switching is executed in this state.

The invention provides a control system for the 4WD vehicle capable of suppressing the switching shock and the unnatural feeling of deceleration occurring when the operation of the disconnect mechanism is canceled during the 2WD running involving the operation of the disconnect mechanism even in the case where it is difficult to increase the E/G torque in the 4WD vehicle configured to be capable of switching the running to the 2WD running involving the operation of the disconnect mechanism.

An aspect of the invention relates to a control system for a 4WD vehicle. The control system includes an engine, an auxiliary drive wheel, a disconnect mechanism, and an electronic control unit. Power is transmitted from the engine to the auxiliary drive wheel during a four-wheel drive running of the four-wheel drive vehicle. The disconnect mechanism is provided in a power transmission path between the engine and the auxiliary drive wheel. The disconnect mechanism is configured to interrupt transmission of the power to a specific rotary element that transmits the power to the auxiliary drive wheel, so as to stop rotation of the specific rotary element. The electronic control unit is configured to: (a) cancel the interruption of the transmission of the power and increase a torque of the engine when the interruption is canceled during a two-wheel drive running in which the disconnect mechanism interrupts the transmission of the power, (b) determine whether the torque of the engine is able to be increased, and (c) suppress a fluctuation in a driving force of the four-wheel drive vehicle occurring during the cancellation of the interruption when the electronic control unit determines that the torque of the engine is unable to be increased.

With this arrangement, even in the case where it is difficult to increase the E/G torque when the operation of the disconnect mechanism is canceled during the 2WD running involving the operation of the disconnect mechanism, an alternative control section that suppresses the fluctuation of the driving force of the 4WD vehicle is operated, and hence it is possible to suppress the switching shock and the unnatural feeling of deceleration occurring during the cancellation of the operation of the disconnect mechanism.

In the control system, the electronic control unit may be configured to extend a time period in which a speed of the specific rotary element is increased. With this arrangement, the rotation speed of the specific rotary element is gradually increased when the operation of the disconnect mechanism is canceled, and hence it is possible to suppress the switching shock and the unnatural feeling of deceleration occurring during the cancellation.

The control system may include an automatic transmission. The automatic transmission may be provided in the power transmission path between the E/G and the disconnect mechanism. The electronic control unit may be configured to change a speed ratio of the automatic transmission such that the driving force is increased. With this arrangement, the speed ratio of the automatic transmission is changed to the increase side of the driving force when the operation of the disconnect mechanism is canceled, and hence the torque that increases the rotation of the specific rotary element is canceled, and it is possible to suppress the switching shock and the unnatural feeling of deceleration occurring during the cancellation of the operation of the disconnect mechanism.

In the control system, a mechanism configured to increase the speed of the specific rotary element may be a clutch configured to control a torque transmitted to the auxiliary drive wheel. With this arrangement, by controlling the T/M torque of the clutch to gradually increase the T/M torque of the clutch, it is possible to change the speed increase mode of the specific rotary element to the increase side of a speed increase time period.

In the control system, the ECU may be configured to prohibit the interruption or restrict a condition for the interruption, when the electronic control unit determines that the torque of the engine is unable to be increased. With this arrangement, in the case where it is difficult to increase the E/G torque, it is possible to hinder the operation of the disconnect mechanism by prohibiting the operation of the disconnect mechanism or tightening the condition for the operation thereof in advance. Consequently, the running is hardly switched to the 2WD running involving the operation of the disconnect mechanism and, as a result, the cancellation of the operation of the disconnect mechanism is prevented. Consequently, it is possible to suppress the switching shock and the unnatural feeling of deceleration occurring during the cancellation of the operation of the disconnect mechanism.

In the control system, the electronic control unit may be configured to prohibit the cancellation of the interruption or restrict a condition for the cancellation of the interruption, when the electronic control unit determines that the torque of the engine is unable to be increased and when the interruption is executed. With this arrangement, in the case where it is difficult to increase the E/G torque during the operation of the disconnect mechanism, the cancellation of the operation of the disconnect mechanism is hindered by prohibiting the cancellation of the operation of the disconnect mechanism or tightening the condition for the prohibition, and hence it is possible to suppress the switching shock and the unnatural feeling of deceleration occurring during the cancellation.

In the control system, the electronic control unit may include a mechanism configured to notify a driver that the fluctuation in the driving force of the four-wheel drive vehicle occurring during the cancellation of the interruption is suppressed when the electronic control unit determines that the torque of the engine is unable to be increased. In addition, the electronic control unit may include a mechanism configured to notify a driver that the fluctuation in the driving force of the four-wheel drive vehicle occurring during the cancellation of the interruption has been suppressed when the electronic control unit determines that the torque of the engine is unable to be increased. With this arrangement, the driver can be aware of the operation of the alternative control section.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Herein, preferably, the operation of a disconnect mechanism is an operation that interrupts power T/M to a specific rotary element transmitting power to an auxiliary drive wheel to thereby stop the rotation thereof. Consequently, when the disconnect mechanism is operated, co-rotation of the specific rotary element is prevented. In addition, cancellation of the operation of the disconnect mechanism is an operation in which a state where the power T/M to the specific rotary element is interrupted and the rotation is stopped is switched to a state where the power is transmitted to the specific rotary element. Consequently, the speed of the specific rotary element is increased, and hence rotational inertia is increased.

Hereinbelow, embodiments of the invention will be described in detail with reference to the drawings. Note that the drawings are appropriately simplified or modified in the following embodiments, and the dimensions and shape of each component are not necessarily precise.

First Embodiment

Figure 1:
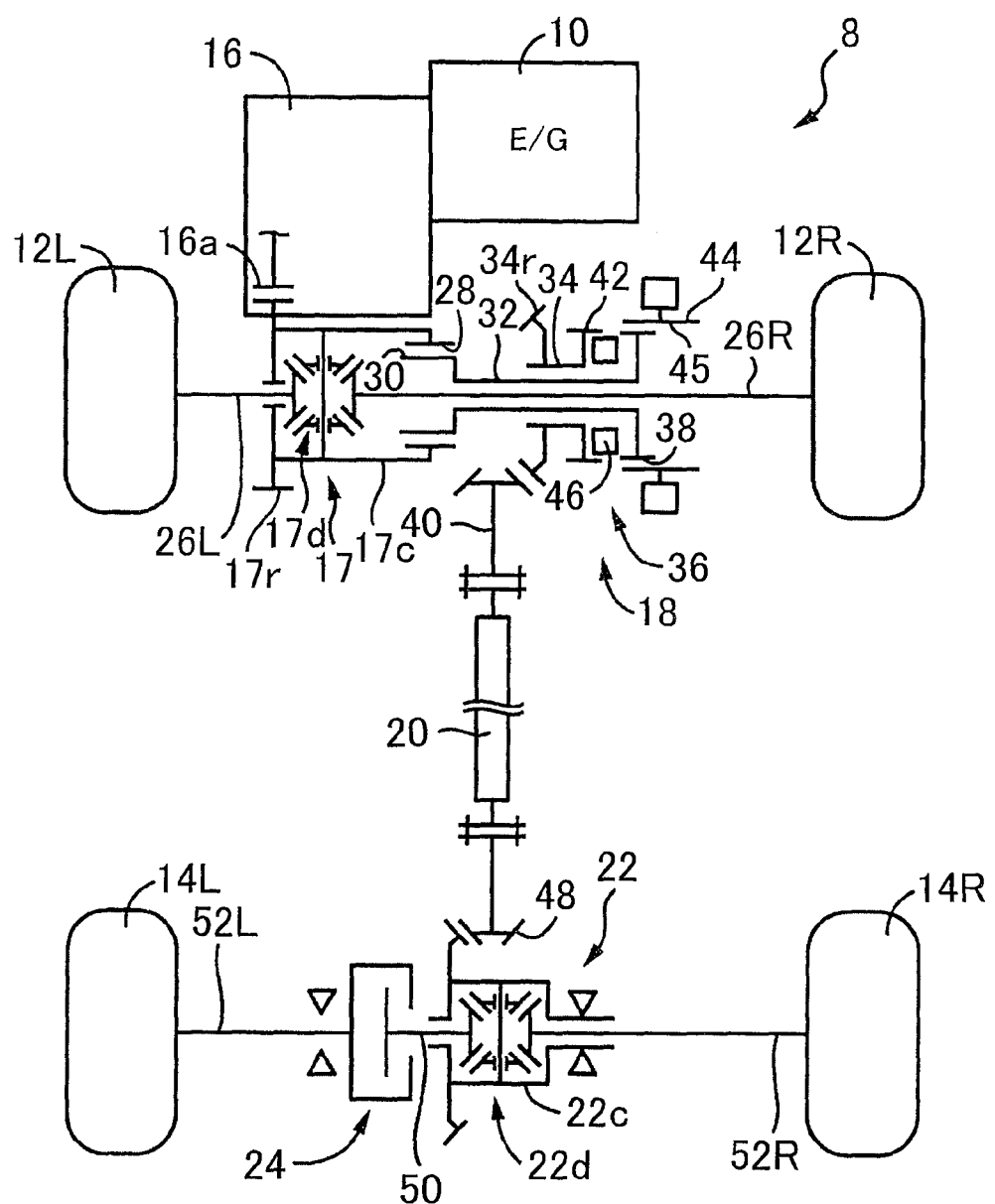
FIG. 1 is a skeleton view schematically explaining the configuration of a 4WD vehicle to which the invention is suitably applied.

FIG. 1 is a skeleton view schematically explaining the configuration of a 4WD vehicle 8 to which the invention is suitably applied. In FIG. 1, the 4WD vehicle 8 is an FF vehicle that uses an E/G 10 as a drive source, and includes a power T/M path that transmits power of the E/G 10 to front wheels 12L and 12R (referred to as front wheels 12 in the case where it is not necessary to differentiate between them), and a power T/M path that transmits the power of the E/G 10 to rear wheels 14L and 14R (referred to as rear wheels 14 in the case where it is not necessary to differentiate between them). The 4WD vehicle 8 includes an automatic T/M 16, a front differential gear 17, a transfer 18, a propeller shaft 20, a rear differential gear 22, and a coupling 24. Although not shown in FIG. 1, a torque converter as a fluid power T/M device is provided between the E/G 10 and the automatic T/M 16. Note that the rear wheel 14 corresponds to an auxiliary drive wheel of the invention to which the power is transmitted from the E/G during a 4WD running.

The automatic T/M 16 is provided in the power T/M path between the E/G 10 and the transfer 18. The automatic T/M 16 is a stepped automatic T/M in which a plurality of planetary gear trains and a plurality of frictional engagement devices (clutch and brake) are provided, and a gear is shifted to a plurality of speed stages by recombination of the plurality of frictional engagement devices. Note that, since the automatic T/M 16 is a conventional technique, the description of its specific structure and operation will be omitted.

The front differential gear 17 includes a case 17c and a differential mechanism 17d configured by a conventional bevel gear, and transmits rotation to left and right axles 26L and 26R of the front wheels 12 while appropriately giving differential rotation thereto. The case 17c of the front differential gear 17 is formed with a ring gear 17r, and the ring gear 17r is engaged with an output gear 16a as an output rotary member of the automatic T/M 16. Consequently, the power outputted from the automatic T/M 16 is inputted to the ring gear 17r. In addition, the case 17c of the front differential gear 17 is formed with an inner peripheral fitting tooth 28 fitted in an outer peripheral fitting tooth 30 of a first rotary member 32 described later. Note that, since the front differential gear 17 is a conventional technique, the description of its specific structure and operation will be omitted.

The transfer 18 is provided side by side with the front differential gear 17. The transfer 18 includes the first rotary member 32 formed with the outer peripheral fitting tooth 30, a second rotary member 34 formed with a ring gear 34r for transmitting the power to the side of the rear wheels 14, and a clutch 36 configured by a dog clutch for selectively connecting and disconnecting the first rotary member 32 to and from the second rotary member 34.

The first rotary member 32 has a cylindrical shape, and the axle 26R extends through the inner peripheral side thereof. One end of the first rotary member 32 in an axial direction is formed with the outer peripheral fitting tooth 30. The outer peripheral fitting tooth 30 is fitted on the inner peripheral fitting tooth 28 formed on the case 17c, and the first rotary member 32 thereby rotates integrally with the case 17c of the front differential gear 17. In addition, the other end of the first rotary member 32 is formed with a clutch tooth 38 constituting the clutch 36.

The second rotary member 34 has a cylindrical shape, and the axle 26R and the first rotary member 32 extend through the inner peripheral side thereof. One end of the second rotary member 34 in the axial direction is formed with a ring gear 34r that is engaged with a driven pinion 40. In addition, the other end of the second rotary member 34 in the axial direction is formed with a clutch tooth 42 constituting the clutch 36. Note that the driven pinion 40 is connected to a drive pinion 48 that transmits the power to the rear differential gear 22 via the propeller shaft 20.

The clutch 36 is a mesh dog clutch that is provided in the transfer 18 for selectively switching the power T/M to the rear wheels 14, and selectively connects and disconnects the first rotary member 32 to and from the second rotary member 34. The clutch 36 includes the clutch tooth 38 of the first rotary member 32, the clutch tooth 42 of the second rotary member 34, a sleeve 44 formed with an inner peripheral tooth 45 that is engageable with the clutch tooth 38 and the clutch tooth 42, and an actuator 46 that drives the sleeve 44 in the axial direction. The sleeve 44 has a substantially cylindrical shape, and the inner peripheral side of the sleeve 44 is formed with the inner peripheral tooth 45 engageable with the clutch tooth 38 and the clutch tooth 42. The sleeve 44 is moved in the axial direction by the actuator 46 that can be electrically (electromagnetically) controlled. In addition, a synchronization mechanism may be further provided in the clutch 36.

FIG. 1 shows a state in which the clutch 36 is disengaged. In this case, the first rotary member 32 is disconnected from the second rotary member 34, and hence the power T/M path between the automatic T/M 16 and the rear wheels 14 is interrupted and the power is not transmitted to the rear wheels 14. On the other hand, when the sleeve 44 is moved toward the front wheel 12L in FIG. 1 and the clutch tooth 38 and the clutch tooth 42 are thereby engaged with the inner peripheral tooth 45 of the sleeve 44, the clutch 36 is engaged and the first rotary member 32 is connected to the second rotary member 34. Consequently, when the first rotary member 32 rotates, the second rotary member 34, the driven pinion 40, the propeller shaft 20, and the drive pinion 48 are integrally rotated.

The rear differential gear 22 includes a case 22c and a differential mechanism 22d configured by a conventional bevel gear. Note that, since the rear differential gear 22 is a conventional technique, the description of its specific structure and operation will be omitted.

The coupling 24 is provided between one output shaft 50 of the rear differential gear 22 and an axle 52L connected to the rear wheel 14L. The coupling 24 performs torque T/M between the axle 52L and the output shaft 50 of the rear differential gear 22. The coupling 24 is an electronically controlled coupling configured by, e.g., a wet multi-plate clutch, and it is possible to control the coupling 24 between disengagement (i.e., the T/M torque is zero) and complete engagement by controlling the T/M torque of the coupling 24. Specifically, when an electric current is supplied to an electromagnetic solenoid (not shown) that controls the T/M torque of the coupling 24, the coupling 24 is engaged with an engagement force proportional to the value of the electric current. For example, in the case where the electric current is not supplied to the electromagnetic solenoid, the engagement force of the coupling 24 becomes zero and, when the electric current to the electromagnetic solenoid is increased, the coupling 24 is brought into the complete engagement. Note that, since the coupling 24 is a conventional technique, the description of its specific structure and operation will be omitted.

Herein, in the case where the clutch 36 is engaged, by adjusting the T/M torque of the coupling 24, torque distribution of the front and rear wheels is appropriately changed. For example, when the T/M torque of the coupling 24 becomes zero, the rear differential gear 22 is brought into an idling state, and hence the power is not transmitted to the rear wheels. That is, the torque distribution of the front wheels and the rear wheels becomes 100:0. On the other hand, when the coupling 24 is brought into the complete engagement, the torque distribution of the front wheels and the rear wheels becomes 50:50. Further, the T/M torque of the coupling 24 is increased as the value of the electric current supplied to the electromagnetic solenoid is increased, and hence the distribution of the torque transmitted to the rear wheel side is increased as the value of the electric current supplied to the electromagnetic solenoid is increased.

The 4WD vehicle 8 configured as described above is capable of running while appropriately switching the running to a 2WD running, a 4WD running, or a 2WD_d running described later in accordance with the running state of the vehicle.

In the 2WD running, the clutch 36 is engaged, and the coupling 24 is disengaged. In this case, since the coupling 24 is disengaged, the rear differential gear 22 is brought into the idling state, the power is not transmitted to the rear wheels 14, and the power is transmitted only to the front wheels 12. In addition, since the clutch 36 is engaged, with the rotation of the first rotary member 32, the second rotary member 34, the driven pinion 40, the propeller shaft 20, the drive pinion 48, and the case 22d of the rear differential gear 22 are co-rotated. The 2WD running is executed in the running state in which immediate switching to the 4WD running is desired such as, e.g., running on a relatively low friction (μ) test road or the like.

In the 4WD running, the clutch 36 is engaged, and the coupling 24 is controlled between half engagement state and the complete engagement. In this case, the power is transmitted to the front wheels 12, and the torque corresponding to the T/M torque of the coupling 24 is transmitted to the rear wheels 14. Note that the rear wheel 14 corresponds to the auxiliary drive wheel to which the power is transmitted from the E/G during the 4WD running in the invention.

In the 2WD_d running, the clutch 36 is disengaged, and the T/M torque of the coupling 24 is controlled to zero. In this case, since the clutch 36 is disengaged and the power T/M path between the first rotary member 32 and the second rotary member 34 is interrupted, the power is not transmitted to the rear wheels 14. Further, since the coupling 24 is also disengaged, the T/M of the power to the individual rotary elements (the second rotary member 34, the driven pinion 40, the propeller shaft 20, the drive pinion 48, and the rear differential gear 22) constituting the power T/M path between the second rotary member 34 and the rear differential gear 22 is interrupted. Consequently, in the 2WD_d running, the co-rotation of the individual rotary elements during the running is prevented, and running resistance caused by the co-rotation of the individual rotary elements is reduced. Herein, each of the rotary elements (the second rotary element 34, the driven pinion 40, the propeller shaft 20, the drive pinion 48, and the rear differential gear 22) corresponds to a specific rotary element that transmits the power to the auxiliary drive wheel during the 4WD in the invention. In addition, the clutch 36 and the coupling 24 constitute the disconnect mechanism that interrupts the power T/M to the specific rotary element of the invention to thereby stop the rotation of the specific rotary element. Further, the 2WD_d running in which the power T/M to the individual rotary elements is interrupted and the co-rotation thereof is prevented corresponds to a 2WD running involving the operation of the disconnect mechanism of the invention, and switching to the 2WD_d running corresponds to the operation of the disconnect mechanism of the invention.

Figure 2:
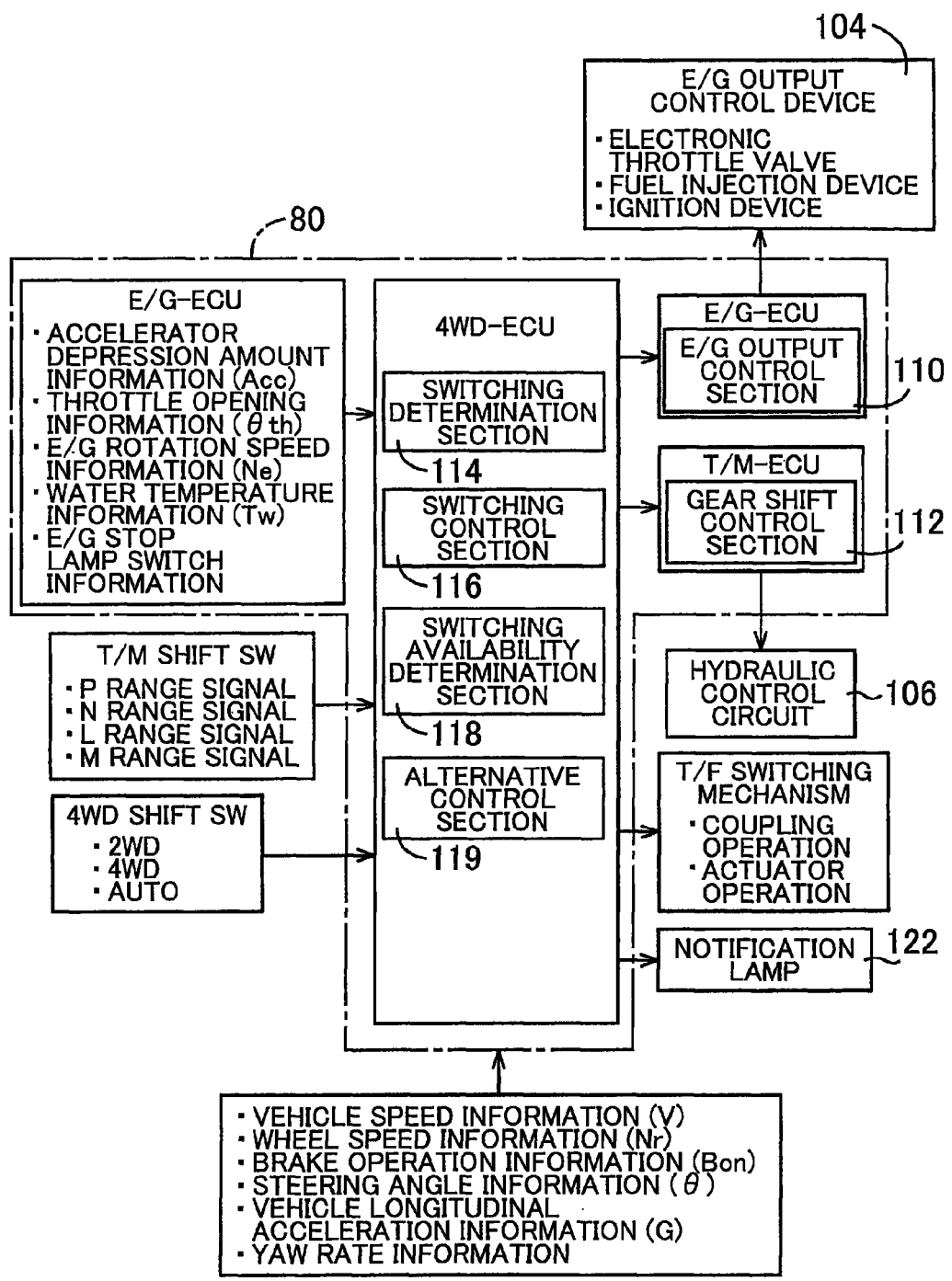
FIG. 2 is a functional block diagram explaining a control system of an ECU that controls the 4WD vehicle of FIG. 1 and also explaining the principal portion of a control function according to the invention of the present application.

FIG. 2 is a functional block diagram explaining the control system of an ECU 80 that controls the 4WD vehicle 8 and also explaining the principal portion of the control function according to the invention of the present application. The ECU 80 includes what is called a microcomputer that includes, e.g., a central processing unit (CPU), a random access memory (RAM), a read only memory (ROM), and an input/output interface, and the CPU performs signal processing according to a program pre-stored in the ROM while using a temporary storage function of the RAM to thereby execute various control of the 4WD vehicle 8. For example, the ECU 80 executes output control of the E/G 10, gear shift control of the automatic T/M 16, and torque capacity control of the clutch 36 and the coupling 24. As surrounded by a one-dot chain line, the ECU 80 of the present embodiment is configured by a plurality of control units such as an E/G-ECU that controls the output of the E/G 10, a 4WD-ECU that controls the drive state of the front and rear wheels, and a T/M ECU that controls the gear shift state of the automatic T/M 16, and information is exchanged among them through communication. Note that the ECU 80 is not necessarily configured by the plurality of control units, and may also be configured by one control unit.

To the ECU 80 (E/G-ECU), accelerator depression amount information (Acc) corresponding to the depression amount of an accelerator pedal detected by an accelerator depression amount sensor (not shown), throttle opening information (θth) of an electronic throttle valve detected by a throttle opening sensor (not shown), E/G rotation speed information (Ne) detected by an E/G rotation speed sensor (not shown), and E/G water temperature information (Tw) detected by a water temperature sensor (not shown) are inputted. To the 4WD-ECU, shift range signals (a parking (P) range signal, an neutral (N) range signal, a drive (D) range signal, a lockup (L) range signal, and a manual (M) range signal) corresponding to shift ranges of the automatic T/M 16 detected by a T/M shift SW, and drive switching signals (2WD, 4WD, and AUTO) of the 4WD vehicle 8 detected by a 4WD shift SW are inputted. In addition, to the ECU 80, vehicle speed information (V) corresponding to a rotation speed Nout of an output shaft of the automatic T/M 16 detected by a vehicle speed sensor (not shown), wheel speed information (Nr) of each wheel detected by a wheel speed sensor provided in each wheel (12 or 14), brake operation information (Bon) indicative of the operation state of a foot brake detected by a foot brake switch (not shown), steering angle information (θ) detected by a steering sensor (not shown), vehicle longitudinal acceleration information (G) detected by an acceleration sensor (not shown), and yaw rate information (Y) detected by a yaw rate sensor (not shown) are inputted.

E/G output control command signals for the output control of the E/G 10 are outputted to an E/G output control device 104 from the ECU 80 (E/G-ECU). Specifically, from the ECU 80, a throttle valve opening signal that drives a throttle actuator for controlling the throttle valve opening θth of the electronic throttle valve, an injection signal for controlling the amount of fuel injected from a fuel injection device, and an ignition timing signal for controlling the ignition timing of the E/G 10 by an ignition device are outputted.

The ECU 80 (T/M-ECU) outputs a gear shift command signal for controlling the gear shift state of the automatic T/M 16 to a hydraulic control circuit 106. In addition, the ECU 80 (4WD-ECU) outputs a signal for switching the engagement/disengagement state of the clutch 36 to the actuator 46, and also outputs a control signal for the T/M torque of the coupling 24 to the electromagnetic solenoid that controls the T/M torque of the coupling 24.

The ECU 80 (E/G-ECU) includes an E/G output control section 110 that controls the output of the E/G 10 as its function. The E/G output control section 110 calculates a requested driving force Tr from a predetermined and pre-stored driving force map that uses the accelerator depression amount Acc (or the throttle opening θth) and the vehicle speed V as variables based on the actual accelerator depression amount Acc (or throttle opening θth) and the actual vehicle speed V, and further calculates an E/G torque Te to be outputted from the E/G 10 in consideration of the speed ratio of the automatic T/M 16. In addition, the E/G output control section 110 outputs a command signal to the E/G output control device 104 such that the calculated E/G torque Te is obtained.

The ECU 80 (T/M-ECU) includes a gear shift control section 112 that executes the gear shift control of the automatic T/M 16 as its function. In the case where a shift position Psh is, e.g., a D position as a forward drive position, the gear shift control section 112 determines a speed stage to be set from a predetermined and pre-stored gear shift map that uses the accelerator depression amount Acc (or throttle opening θth) and the vehicle speed V as variables based on the actual accelerator depression amount Acc (or the throttle opening θth) and the actual vehicle speed V, and outputs a command for establishing the determined speed stage to the hydraulic control circuit 106.

The ECU 80 (4WD-ECU) includes a switching determination section 114 that determines whether or not the drive state of the 4WD vehicle 8 is to be switched, and a switching control section 116 that switches the drive state of the 4WD vehicle 8 as its functions.

The switching determination section 114 determines whether or not the drive state of the 4WD vehicle 8 is to be switched. For example, in the case where a rotation speed difference ΔNr in the wheel speed Nr between the front and rear wheels exceeds a pre-set specific value Nr1, the switching determination section 114 determines that the 4WD vehicle 8 runs in the 4WD running state. Note that the specific value Nr1 is set to a value at which it is determined that the vehicle is slipping. In addition, in the case where the vehicle is running on a slippery road surface such as, e.g., a low friction test road, the switching determination section 114 determines that the vehicle runs in the 2WD running state such that quick switching to the 4WD running is allowed against slipping.

When the switching determination section 114 determines that the vehicle is in a steady running state in which sharp turn, sudden acceleration, or sudden braking does not occur during the running, the switching determination section 114 determines that the vehicle runs in the 2WD_d running state. For example, in the case where a state in which the rate of change of the vehicle speed V is not more than a pre-set specific value has continued for a specific time period or longer, in the case where a state in which the longitudinal acceleration G is not more than a pre-set specific value has continued for a specific time period or longer, or in the case where a state in which the absolute value or the rate of change (dθ/dt) of the steering angle θ is not more than a pre-set specific value has continued for a specific time period or longer, the switching determination section 114 determines that the steady running state continues, and determines that the vehicle runs in the 2WD_d running state.

When the switching determination section 114 determines that the vehicle runs in, e.g., the 2WD_d running state, the switching control section 116 outputs commands to disengage the clutch 36 and control the T/M torque of the coupling 24 to zero to the actuator 46 and the electromagnetic solenoid of the coupling 24. Specifically, the switching control section 116 performs feedback control such that the drive amount of the actuator 46 follows a pre-set target drive amount that allows the disengagement of the clutch 36. Concurrently with this, the switching control section 116 controls the electric current value of the electromagnetic solenoid of the coupling 24 to zero to thereby control the T/M torque to zero. Subsequently, the switching control section 116 performs control such that the 2WD_d running is maintained while it is determined that the vehicle runs in the 2WD_d running state.

In addition, when the switching determination section 114 determines that the vehicle runs in, e.g., the 2WD running state, the switching control section 116 outputs commands to engage the clutch 36 and control the T/M torque of the coupling 24 to zero. Specifically, the switching control section 116 performs the feedback control such that the drive amount of the actuator 46 follows a pre-set target drive amount that allows the engagement of the clutch 36. Concurrently with this, the switching control section 116 controls the electric current value of the electromagnetic solenoid of the coupling 24 to zero to thereby control the T/M torque to zero.

In addition, when the switching determination section 114 determines that the vehicle runs in, e.g., the 4WD running state, the switching control section 116 engages the clutch 36, and controls the T/M torque of the coupling 24 to a value calculated based on the running state of the vehicle.

Herein, when the determination for switching to the 4WD running is made by the switching determination section 114 during the 2WD_d running, the switching control section 116 controls the T/M torque of the coupling 24 to the T/M torque calculated based on the running state of the vehicle. At this point, with rotational inertia of each of the rotary elements (the second rotary element 34, the driven pinion 40, the propeller shaft 20, and the drive opinion 48) of which rotation is stopped by the interruption of the power T/M, a switching shock and an unnatural feeling of deceleration resulting from an increase in rotational inertia occur during the switching. Note that the rotation speeds of engagement elements of the clutch 36 become substantially equal to each other, the clutch 36 is engaged.

In order to solve this problem, when the running is switched to the 4WD running during the 2WD_d running, the E/G output control section 110 increases the E/G torque Te at the time of switching to the 4WD running to cancel an increase in the speed increase inertia torque of each rotary element and reduce the switching shock and the feeling of deceleration. However, when it is not possible to increase the E/G torque Te at the time of the switching such as, e.g., the case where a communication abnormality occurs between the 4WD-ECU and the E/G-ECU, or the case where a malfunction occurs in the throttle opening sensor, it becomes difficult to cancel the increase in rotational inertia and, as a result, the switching shock and the unnatural feeling of deceleration resulting from the increase in rotational inertia occur. To cope with this, even when it becomes difficult to increase the E/G torque Te at the time of the switching, an alternative control section 119 suppresses a change in the driving force of the 4WD vehicle 8 to thereby suppress the switching shock and the unnatural feeling of deceleration by executing control described below. Note that switching from the 2WD_d running to the 4WD running or the 2WD running corresponds to the cancellation of the operation of the disconnect mechanism of the invention.

Returning to FIG. 2, a switching availability determination section 118 determines whether or not it is possible to increase the E/G torque Te at the time of the switching from the 2WD_d running to the 4WD running by diagnosing the communication state of the ECU 80 and the vehicle state at any time.

In the case where the switching availability determination section 118 determines that it is difficult to increase the E/G torque Te at the time of the switching, the alternative control section 119 is operated. The alternative control section 119 outputs to the switching control section 116 a command to reduce the rate of change (rate of increase) of the T/M torque of the coupling 24 during the switching control such that the rate of change thereof is lower than that in the case where it is possible to increase the E/G torque Te. For example, the alternative control section 119 pre-stores the rate of change of the T/M torque in the case where it is difficult to increase the E/G torque Te, and the rate of change in the case where it is difficult to increase the E/G torque Te is set to a value lower than the value in the case where it is possible to increase the E/G torque Te. In the case where it is difficult to increase the E/G torque Te, the switching control section 116 increases the T/M torque according to the rate of change of the T/M torque in the case where it is difficult to increase the E/G torque Te that is stored in the alternative control section 119. Consequently, the speed of each of the rotary elements is gradually increased and, as a result, the speed increase mode of each rotary element is changed to the increase side of a speed increase time period. With an increase in speed increase time period, the speed of each rotary element is gradually increased so that a sharp increase in rotational inertia is suppressed, and hence a fluctuation in the driving force of the 4WD vehicle 8 is suppressed, and the switching shock and the unnatural feeling of deceleration occurring during the switching are reduced. Note that the rate of change of the T/M torque of the coupling 24 set in the case where it is difficult to increase the E/G torque Te is empirically predetermined, and the rate of change thereof is set to a threshold value at which a driver hardly feels an uncomfortable feeling due to the switching shock and the unnatural feeling of deceleration occurring during the switching to the 4WD running. Note that the coupling 24 corresponds to a clutch that controls the T/M torque to the auxiliary drive wheel of the invention.

In addition, the alternative control section 119 turns on a notification lamp 122 provided in a driver's seat after or simultaneously with (or immediately before) the operation of the above-described control (hereinafter referred to as alternative control). Consequently, the driver can be aware of execution of the alternative control. Note that a notification sound can be generated in addition to the turning-on of the notification lamp 122. Note that the notification lamp 122 corresponds to a mechanism notifying the driver that the alternative control section of the invention operates or that the alternative control section has operated.

Figure 3:
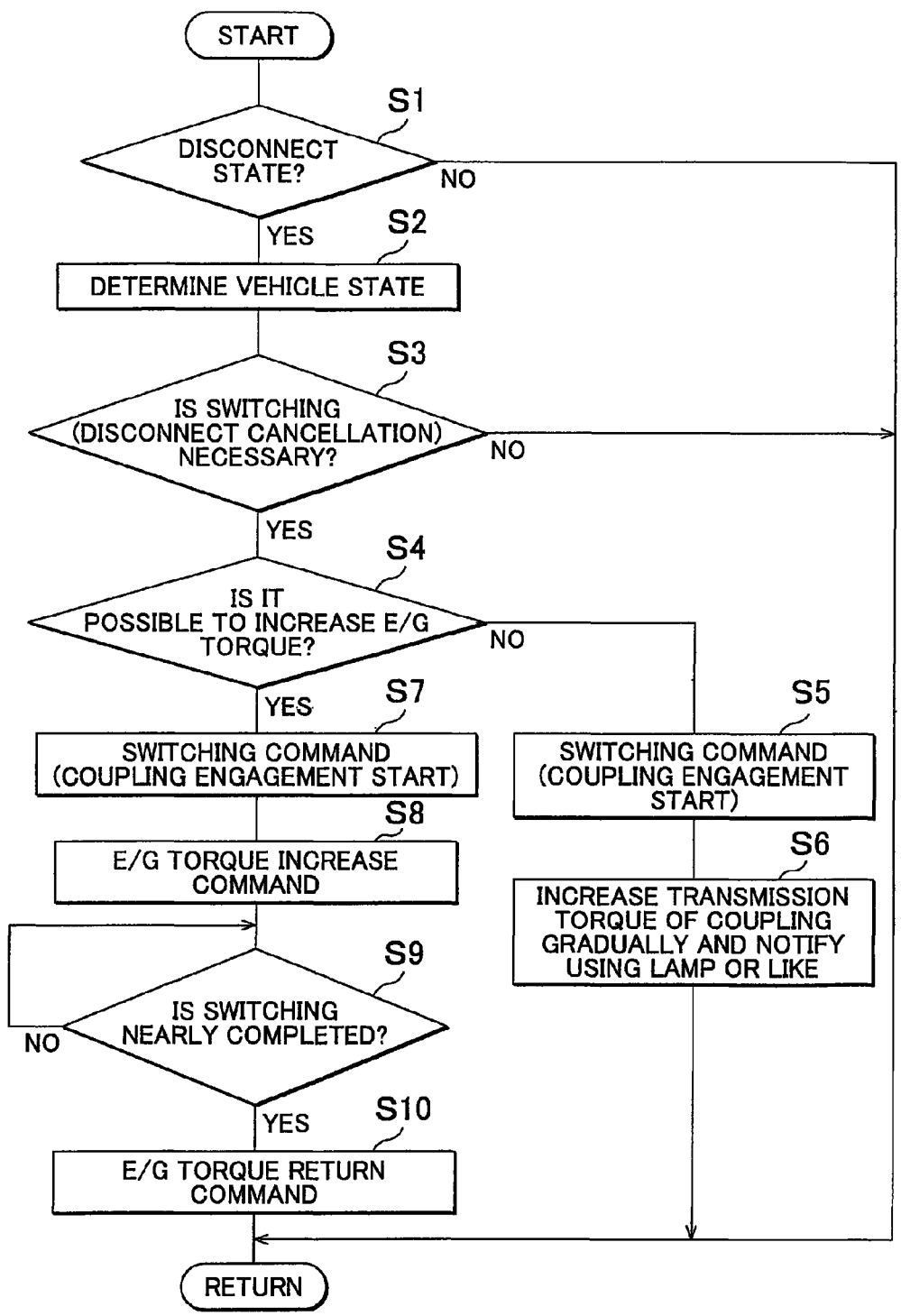
FIG. 3 is a flowchart for explaining the principal portion of a control operation of the ECU of FIG. 2, i.e., the control operation that reduces a switching shock and an unnatural feeling of deceleration occurring during switching when a running is switched from a 2WD_d running to a 4WD running.

FIG. 3 is a flowchart for explaining the principal portion of the control operation of the ECU 80, i.e., the control operation that suppresses the switching shock and the unnatural feeling of deceleration occurring during the switching when the running is switched from the 2WD_d running to the 4WD running. This flowchart is repeatedly executed at an extremely short cycle time of, e.g., about several msec to several tens of msec.

First, in step S1 (hereinafter the step will be omitted) corresponding to the switching determination section 114, it is determined whether or not the current running state is the 2WD_d running state (disconnect state). In the case where the determination in S1 is negative, the present routine is ended. In the case where the determination in S1 is affirmative, in S2 corresponding to the switching determination section 114, the running state of the vehicle is determined and, in S3 corresponding to the switching determination section 114, it is determined whether or not the switching to the 4WD running (disconnect cancellation) is necessary based on the vehicle state determined in S2. In the case where the determination in S3 is negative, the present routine is ended. In the case where the determination in S3 is affirmative, in S4 corresponding to the switching availability determination section 118, it is determined whether or not it is possible to increase the E/G torque Te during the switching to the 4WD running. In the case where the determination in S4 is affirmative, i.e., in the case where it is possible to increase the E/G torque Te, in S7 corresponding to the switching control section 116, the switching to the 4WD running is started. Specifically, the engagement of the clutch 36 and an increase in the T/M torque of the coupling 24 are started. Subsequently, in S8 corresponding to the E/G output control section 110, a command to increase the E/G torque Te is outputted, and the E/G torque Te is increased correspondingly to the increase in the rotational inertia of each of the rotary elements. In S9 corresponding to the switching control section 116, it is determined whether or not the switching to the 4DW running is nearly completed (close to completion) based on the drive amount of the actuator 46 of the clutch 36 and elapsed time since the start of the switching. In the case where the determination in S9 is negative, the flow returns to S9, and the switching to the 4WD running is continuously executed. In the case where the determination in S9 is affirmative, in S10 corresponding to the E/G output control section 110, a command to return the E/G torque Te to the normal state is outputted, and the E/G torque Te is reduced.

Returning to S4, in the case where the determination in S4 is negative, in S5 corresponding to the switching control section 116, the engagement of the clutch 36 and the increase in the T/M torque of the coupling 24 are started. Subsequently, in S6 corresponding to the alternative control section 119 and the switching control section 116, the T/M torque of the coupling 24 is increased gradually as compared with the case where it is possible to increase the E/G torque Te. Consequently, the switching shock and the unnatural feeling of deceleration occurring during the switching to the 4WD running are reduced. Further, the notification lamp 122 is turned on, and the driver is thereby notified of the execution of the alternative control.

Figure 4:
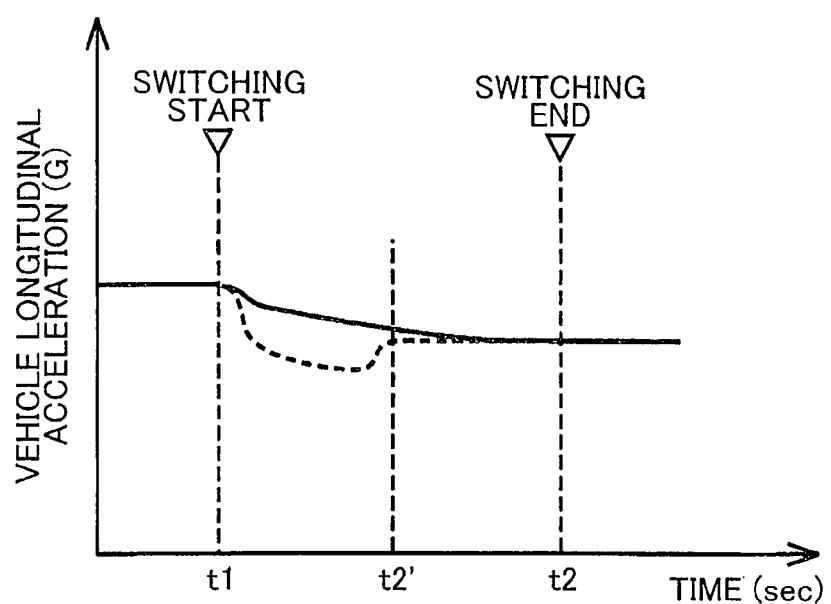
FIG. 4 is a time chart for explaining a control result based on the control operation of the ECU of FIG. 2 in the case where it becomes difficult to increase an E/G torque when the running is switched to the 4WD running during the 2WD_d running, i.e., the operation of a disconnect mechanism is canceled.

FIG. 4 is a time chart showing the control result based on the control operation of the ECU 80 in the case where it becomes difficult to increase the E/G torque Te when the running is switched to the 4WD running during the 2WD_d running, i.e., when the operation of the disconnect mechanism is canceled. In FIG. 4, the horizontal axis indicates elapsed time, and the vertical axis indicates the vehicle longitudinal acceleration G. In addition, the solid line corresponds to the control mode of the present embodiment, and the broken line corresponds to the conventional control mode.

First, the conventional control mode indicated by the broken line will be described. When the increase in the T/M torque of the coupling 24 is started and the switching from the 2WD_d running to the 4WD running is started at time point t1 shown in FIG. 4, even in the case where it is difficult to increase the E/G torque Te, the rotational inertia torque of each of the rotary elements of which rotation has been stopped by the interruption of the power T/M is increased in the case where the engagement torque of the coupling 24 is increased at a normal rate of change, and hence the unnatural feeling of deceleration and the switching shock occur as indicated by the broken line. On the other hand, in the case indicated by the solid line corresponding to the present embodiment, when the switching from the 2WD_d running to the 4WD running is started at time point t1, the engagement torque of the coupling 24 is changed gradually as compared with the conventional case. As a result, although a time period required until the speed of each of the individual rotary elements is increased is increased (changed to the increase side of the speed increase time period), the change in vehicle longitudinal acceleration G is made smooth, and the switching shock and the unnatural feeling of deceleration occurring during the switching are suppressed.

As described above, according to the present embodiment, even in the case where it is difficult to increase the E/G torque Te when the running is switched to the 4WD running during the 2WD_d running, since the alternative control section 119 that suppresses the fluctuation in the driving force of the 4WD vehicle 8 is operated, it is possible to suppress the switching shock and the unnatural feeling of deceleration occurring during the switching to the 4WD running.

In addition, according to the present embodiment, the alternative control section 119 changes the speed increase mode of each rotary element to the increase side of the speed increase time period, whereby the rotation speed of each rotary element is gradually increased during the switching to the 4WD running, and it is possible to suppress the switching shock and the unnatural feeling of deceleration occurring during the cancellation.

Further, according to the present embodiment, the notification lamp 122 that notifies the driver that the alternative control section 119 is operated or that the alternative control section 119 has been operated is provided, and the driver can be thereby aware of the operation of the alternative control section 119.

Next, another embodiment of the invention will be described. Note that, in the following description, portions common to the above-described embodiment are denoted by the same reference numerals and the description thereof will be omitted.

Second Embodiment

In the embodiment described above, in the case where it is difficult to increase the E/G torque Te during the switching from the 2WD_d running to the 4WD running, the T/M torque of the coupling 24 is reduced to be lower than that in the case where it is possible to increase the E/G torque Te. However, in the present embodiment, when the running is switched from the 2WD_d running to the 4WD running or the 2WD running, the speed ratio of the automatic T/M 16 is changed to the increase side of the driving force, and the increase in rotational inertia is thereby canceled.

In the case where the switching availability determination section 118 determines that it is difficult to increase the E/G torque Te when the running is switched from the 2WD_d running to the 4WD running or the 2WD running, the alternative control section 119 of the present embodiment outputs to the gear shift control section 112 a command to change the speed ratio of the automatic T/M 16 to the increase side of the driving force (shift-down side) before or simultaneously with the start of, the switching. When the automatic T/M 16 is shifted down, the torque outputted from the automatic T/M 16 is increased, and hence it is possible to compensate for the increase in the E/G torque Te by using the increase in the torque of the automatic. T/M 16. In addition, when the switching to the 4WD running is completed, the alternative control section 119 outputs a command to return the speed ratio to the speed ratio corresponding to the running state of the vehicle to the gear shift control section 112. Note that the speed ratio (speed stage) after the shift-down is set to a value that allows compensation of the increase in the E/G torque Te.

Figure 5:
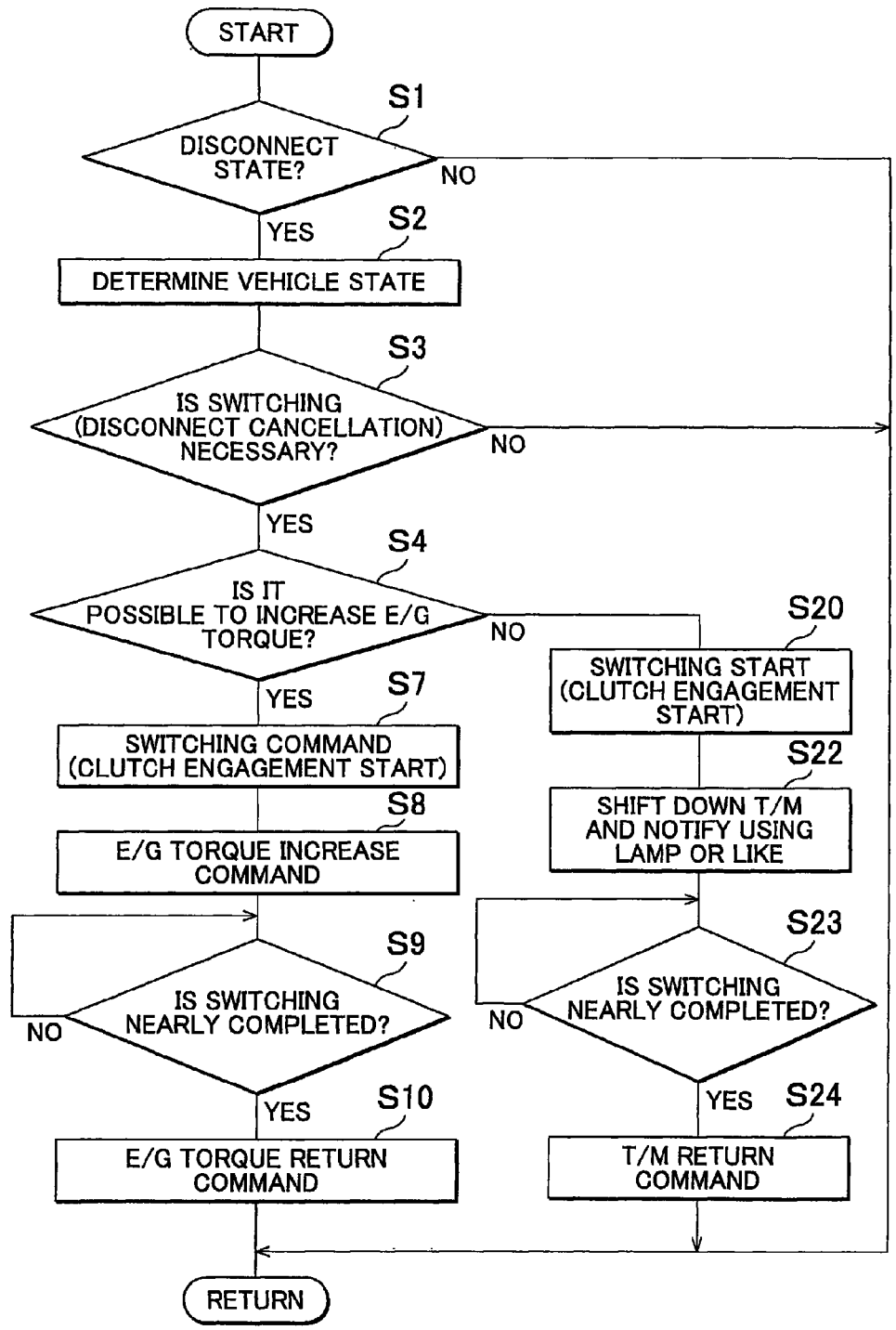
FIG. 5 is a flowchart for explaining another aspect explaining the principal portion of the control operation of an ECU of another embodiment of the invention, i.e., the control operation that reduces the switching shock and the unnatural feeling of deceleration occurring during the switching when the running is switched from the 2WD_d running to the 4WD running.

FIG. 5 is a flowchart for explaining the principal portion of the control operation of the ECU 80 of the present embodiment, i.e., the control operation that reduces the switching shock and the unnatural feeling of deceleration occurring during the switching when the running is switched from the 2WD_d running to the 4WD running or the 2WD running.

First, in step S1 corresponding to the switching determination section 114, it is determined whether or not the current running state is the 2WD_d running state (disconnect state). In the case where the determination in S1 is negative, the present routine is ended. In the case where the determination in S1 is affirmative, the running state of the vehicle is determined in S2 corresponding to the switching determination section 114 and, in S3 corresponding to the switching determination section 114, it is determined whether or not the switching to the 4WD running or the 2WD running (disconnect cancellation) is necessary based on the vehicle state determined in S2. In the case where the determination in S3 is negative, the present routine is ended. In the case where the determination in S3 is affirmative, in S4 corresponding to the switching availability determination section 118, it is determined whether or not it is possible to increase the E/G torque Te. In the case where the determination in S4 is affirmative, i.e., in the case where it is possible to increase the E/G torque Te, in S7 corresponding to the switching control section 116, the switching to the 4WD running or the 2WD running is started. Subsequently, in S8 corresponding to the E/G output control section 110, the command to increase the E/G torque Te is outputted, and the E/G torque Te is increased. In S9 corresponding to the switching control section 116, it is determined whether or not the switching to the 4WD running or the 2WD running is nearly completed (close to completion) based on the drive amount of the actuator 46 of the clutch 36 and the elapsed time since the start of the switching. In the case where the determination in S9 is negative, the flow returns to S9, and the switching to the 4WD running or the 2WD running is continuously executed. In the case where the determination in S9 is affirmative, in S10 corresponding to the E/G output control section 110, the command to return the E/G torque Te to the normal state is outputted.

Returning to S4, in the case where the determination in S4 is negative, in S20 corresponding to the switching control section 116, the engagement of the clutch 36 and the increase in the T/M torque of the coupling 24 (zero in the case of the switching to the 2WD running) are started. Subsequently, in S22 corresponding to the alternative control section 119 and the gear shift control section 112, the automatic T/M 16 is shifted down to the increase side of the driving force. Concurrently with this, the notification lamp 122 is turned on. In S23 corresponding to the switching control section 116, it is determined whether or not the switching to the 4DW running or the 2WD running is nearly completed (close to completion). In the case where the determination in S23 is negative, the flow returns to S23, and the switching to the 4WD running or the 2WD running is continuously executed. In the case where the determination in S23 is affirmative, in S24 corresponding to the alternative control section 119 and the gear shift control section 112, the speed ratio of the automatic T/M 16 is returned to the normal speed ratio.

Figure 6:
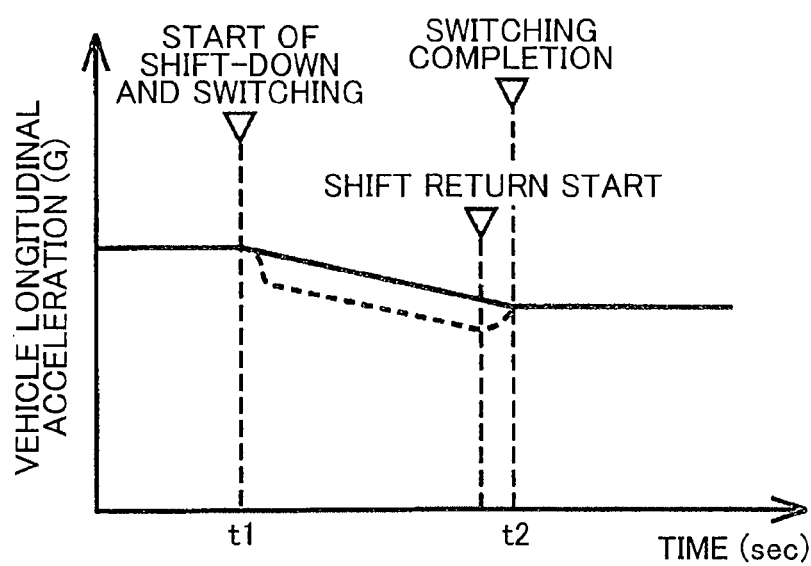
FIG. 6 is a time chart for explaining a control result based on the flowchart of FIG. 5 in the case where it becomes difficult to increase the E/G torque when the running is switched to the 4WD running during the 2WD_d running, i.e., the operation of the disconnect mechanism is canceled.

FIG. 6 is a time chart showing the control result of the ECU of the present embodiment in the case where it becomes difficult to increase the E/G torque Te when the running is switched to the 4WD running or the 2WD running during the 2WD_d running, i.e., when the operation of the disconnect mechanism is canceled. In FIG. 6, the horizontal axis indicates elapsed time, and the vertical axis indicates the vehicle longitudinal acceleration G.

As shown in FIG. 6, when the switching to the 4WD running or the 2WD running is started at time point t1, concurrently with this, the shift-down of the automatic T/M 16 is started. Consequently, the torque outputted from the automatic T/M 16 is increased, and hence the increase in the rotational inertia of each of the rotary elements of which rotation has been stopped by the interruption of the power T/M caused by the engagement of the clutch 36 is canceled. Consequently, the switching shock and the unnatural feeling of deceleration occurring during the switching are reduced.

As described above, according to the present embodiment, since the speed ratio of the automatic T/M 16 is changed to the increase side of the driving force when the running is switched from the 2WD_d running to the 4WD running or the 2WD running, the torque that increases the rotation of each rotary element is canceled, and it is possible to suppress the switching shock and the unnatural feeling of deceleration occurring during the switching.

Third Embodiment

Figure 7:
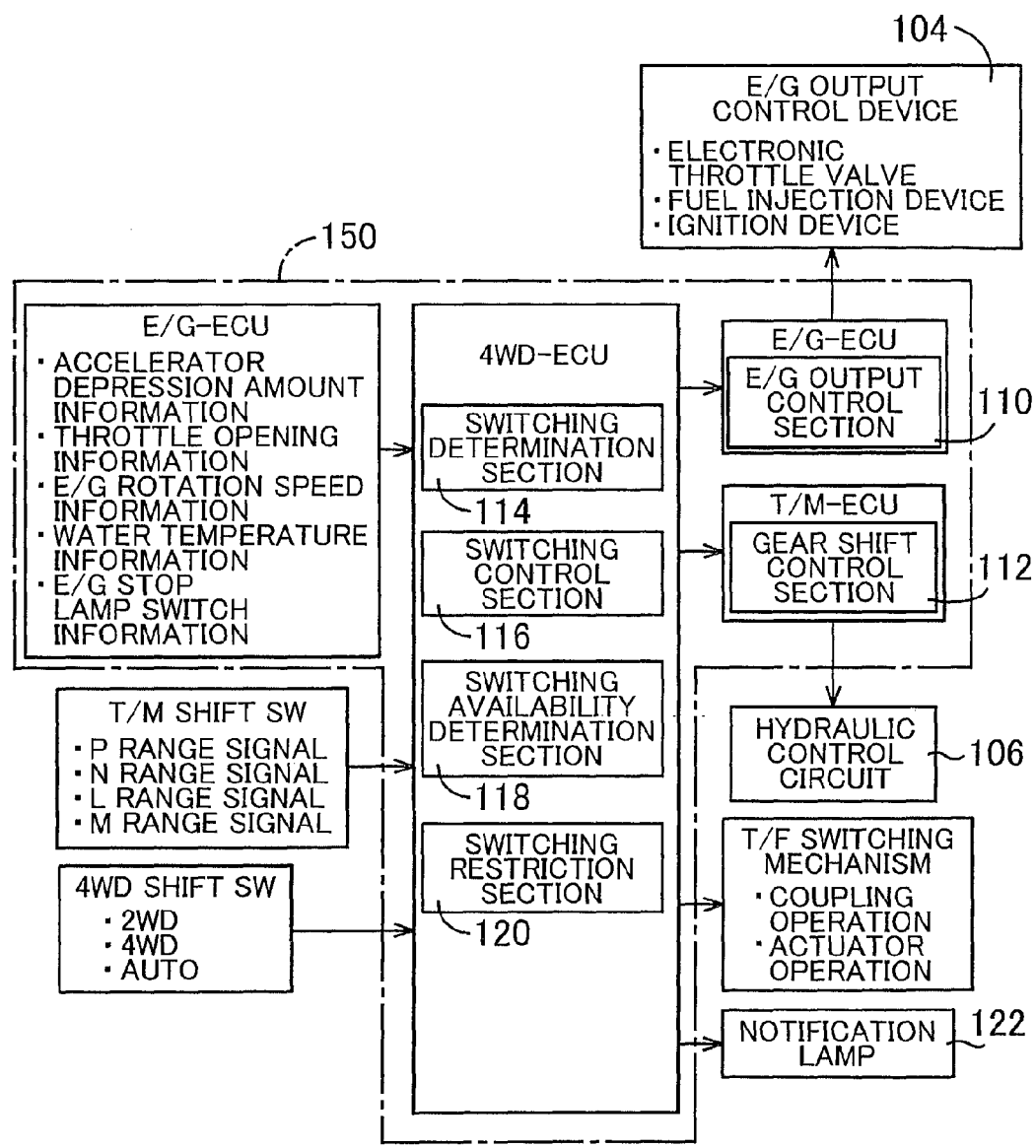
FIG. 7 is a functional block diagram explaining the control system of an ECU as still another embodiment of the invention, and also explaining the principal portion of the control function.

FIG. 7 is a functional block diagram explaining the control system of an ECU 150 as still another embodiment of the invention and also explaining the principal portion of the control function. When the ECU 150 in FIG. 7 is compared with the ECU 80 in FIG. 2, the ECU 150 additionally includes a switching restriction section 120 as its function. Hereinbelow, the switching restriction section 120 additionally provided in the present embodiment will be described.

When the switching availability determination section 118 determines that it is difficult to increase the E/G torque Te, in the case where the vehicle runs in the 4WD running state or the 2WD running state, the switching restriction section 120 prohibits the switching to the 2WD_d running even when the switching to the 2WD_d running is determined. Alternatively, the switching restriction section 120 tightens a condition for the switching to the 2WD_d running. The switching restriction section 120 tightens the condition for the switching to the 2WD_d running by, e.g., changing determination values of various parameters for determining the switching to the 2WD_d running. The switching restriction section 120 tightens the condition for the switching to the 2WD_d running by, e.g., setting the specific value of the rate of change of the vehicle speed V used to determine the switching to the 2WD_d running to a low value in the vicinity of zero, setting the specific value of the longitudinal acceleration G to a low value in the vicinity of zero, or setting the specific value of the steering angle θ to a low value in the vicinity of zero. With this, in the case where it is difficult to increase the E/G torque Te, by prohibiting the switching to the 2WD_d running or tightening the condition for the switching to the 2WD_d running, the running is hardly switched from the 4WD running or the 2WD running to the 2WD_d running. Consequently, since the running in the 2WD_d running state is suppressed in advance, the switching from the 2WD_d running to the 4WD running or the 2WD running is also suppressed. As a result, the switching shock and the unnatural feeling of deceleration occurring when the running is switched from the 2WD_d running to the 4WD running or the 2WD running is suppressed.

In addition, during the 2WD_d running, the switching restriction section 120 prohibits the switching to the 4WD running or the 2WD running. Alternatively, the switching restriction section 120 tightens the condition for the switching to the 4WD running or the 2WD running. For example, by setting the rotation speed difference ΔNr in the wheel speed Nr between the front and rear wheels used to determine the switching to the 4WD running to a value larger than a normal value, the switching restriction section 120 tightens the condition for the switching to the 4WD running. With this, the switching from the 2WD_d running to the 4WD running or the 2WD running is suppressed, and the switching shock and the unnatural feeling of deceleration caused by the switching are suppressed.

In addition, in order to notify the driver of the prohibition of the switching to the 2WD_d running or the tightening of the condition for the switching to the 2WD_d running, the switching restriction section 120 also turns on the notification lamp 122. Similarly, in order to notify the driver of the prohibition of the switching from the 2WD_d running to the 4WD running or the 2WD running or the tightening of the condition therefor, the switching restriction section 120 turns on the notification lamp 122.

Figure 8:
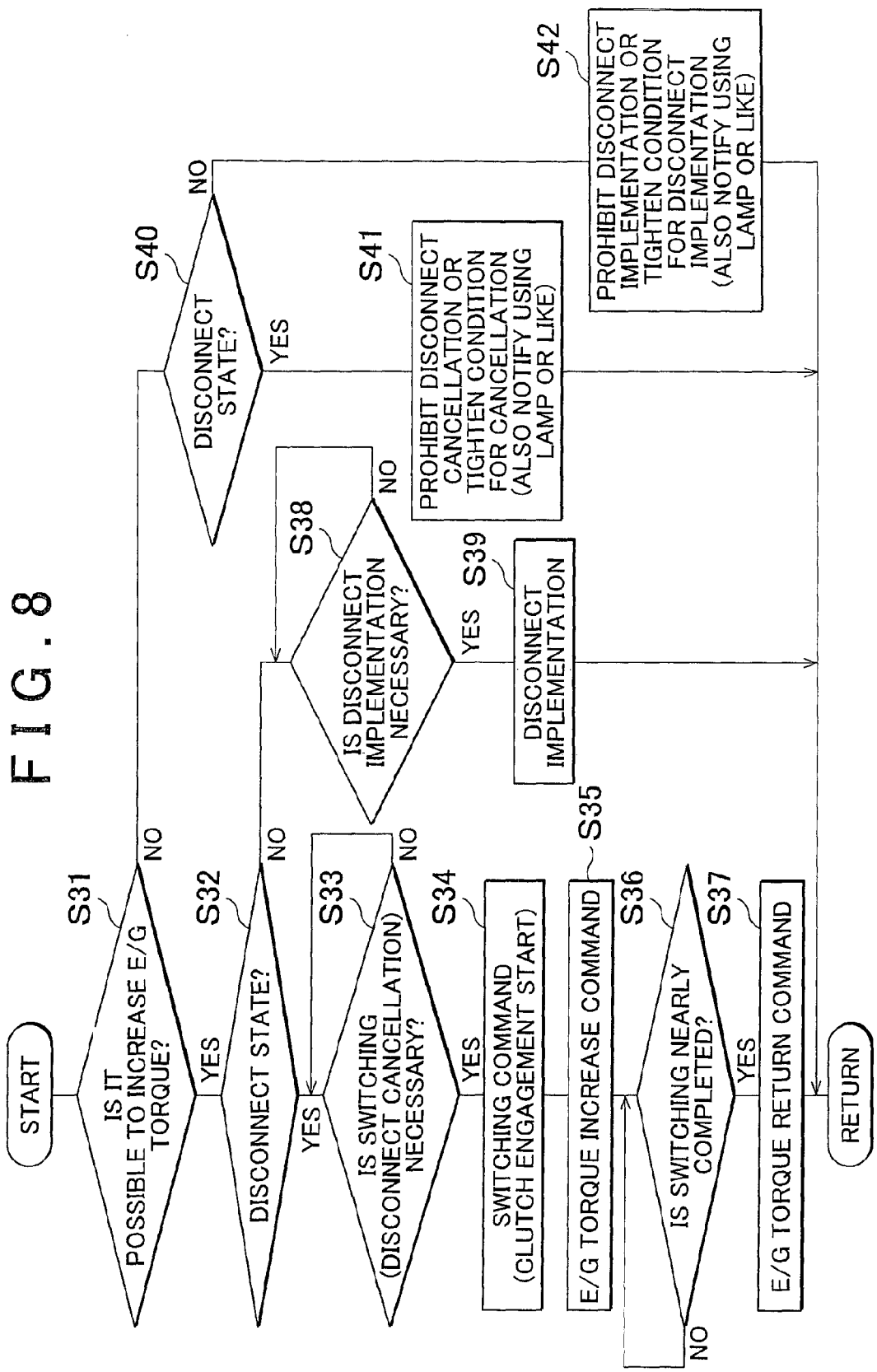
FIG. 8 is a flowchart for explaining the principal portion of the control operation of the ECU of FIG. 7, i.e., the control operation that suppresses the switching shock and the unnatural feeling of deceleration occurring during the switching when the running is switched from the 2WD_d running to the 4WD running or a 2WD running.

FIG. 8 is a flowchart for explaining the principal portion of the control operation of the ECU 150 of the present embodiment, i.e., the control operation that suppresses the switching shock and the unnatural feeling of deceleration occurring during the switching when the drive state is switched.

First, in S31 corresponding to the switching availability determination section 118, it is determined whether or not it is possible to increase the E/G torque Te. In the case where the determination in S31 is affirmative, in S32 corresponding to the switching determination section 114, it is determined whether or not the current running state is the 2WD_d running state (disconnect state). In the case where the determination in S32 is affirmative, in S33 corresponding to the switching determination section 114, it is determined whether or not the switching to the 4WD running or the 2WD running (disconnect cancellation) is necessary. In the case where the determination in S33 is negative, the flow returns to S33, and the same determination is repeatedly executed until the determination in S33 becomes affirmative. In the case where the determination in S33 is affirmative, in S34 corresponding to the switching control section 116, the command to switch the running to the 4WD running or the 2WD running is outputted, and the engagement of the clutch 36 and the T/M torque increase control of the coupling 24 are started. Subsequently, in S35 corresponding to the E/G output control section 110, the command to increase the E/G torque Te is outputted, and the E/G torque Te is increased. In S36 corresponding to the switching control section 116, it is determined whether or not the switching to the 4DW running or the 2WD running is nearly completed (close to completion). In the case where the determination in S36 is negative, the flow returns to S36, and the above determination is repeatedly executed until the determination in S36 becomes affirmative. In the case where the determination in S36 is affirmative, in S37 corresponding to the E/G output control section 110, the command to return the E/G torque Te to the normal state is outputted, and the E/G torque Te is reduced.

Returning to S32, in the case where the determination in S32 is negative, i.e., in the case where the vehicle runs in the 4WD running state or the 2WD running state, in S38 corresponding to the switching determination section 114, it is determined whether or not the switching to the 2WD_d running is necessary. In the case where the determination in S38 is negative, the determination in S38 is repeatedly executed until the determination in S38 becomes affirmative.

In the case where the determination in S38 is affirmative, in S39 corresponding to the switching control section 116, the switching to the 2WD_d running (disconnect implementation) is executed.

Returning to S31, in the case where the determination in S31 is negative, in S40 corresponding to the switching determination section 114, it is determined whether or not the 2WD_d running state is established. In the case where the determination in S40 is affirmative, in S41 corresponding to the switching restriction section 120, the switching to the 4WD running or the 2WD running is prohibited, or the condition for the switching is set so as to be tightened. Concurrently with this, the notification lamp 122 is turned on. In the case where the determination in S40 is negative, in S42 corresponding to the switching restriction section 120, the switching to the 2WD_d running is prohibited, or the condition for the switching to the 2WD_d running is set so as to be tightened. Concurrently with this, the notification lamp 122 is turned on.

As described above, according to the present embodiment, in the case where it is difficult to increase the E/G torque Te, the operation of the switching to the 2WD_d running is hindered by prohibiting the switching to the 2WD_d running or tightening the condition for the switching in advance. Consequently, the switching to the 2WD_d running is hardly executed and, as a result, the switching from the 2WD_d running to the 4WD running or the 2WD running is suppressed. Consequently, it is possible to suppress the switching shock and the unnatural feeling of deceleration occurring during the switching from the 2WD_d running to the 4WD running or the 2WD running.

In addition, according to the present embodiment, in the case where it is difficult to increase the E/G torque Te during the 2WD_d running, since the switching from the 2WD_d running to the 4WD running or the 2WD running is hindered by prohibiting the switching to the 4WD running or the 2WD running or tightening the condition for the switching, it is possible to suppress the switching shock and the unnatural feeling of deceleration occurring during the switching.

Fourth Embodiment

Figure 9:
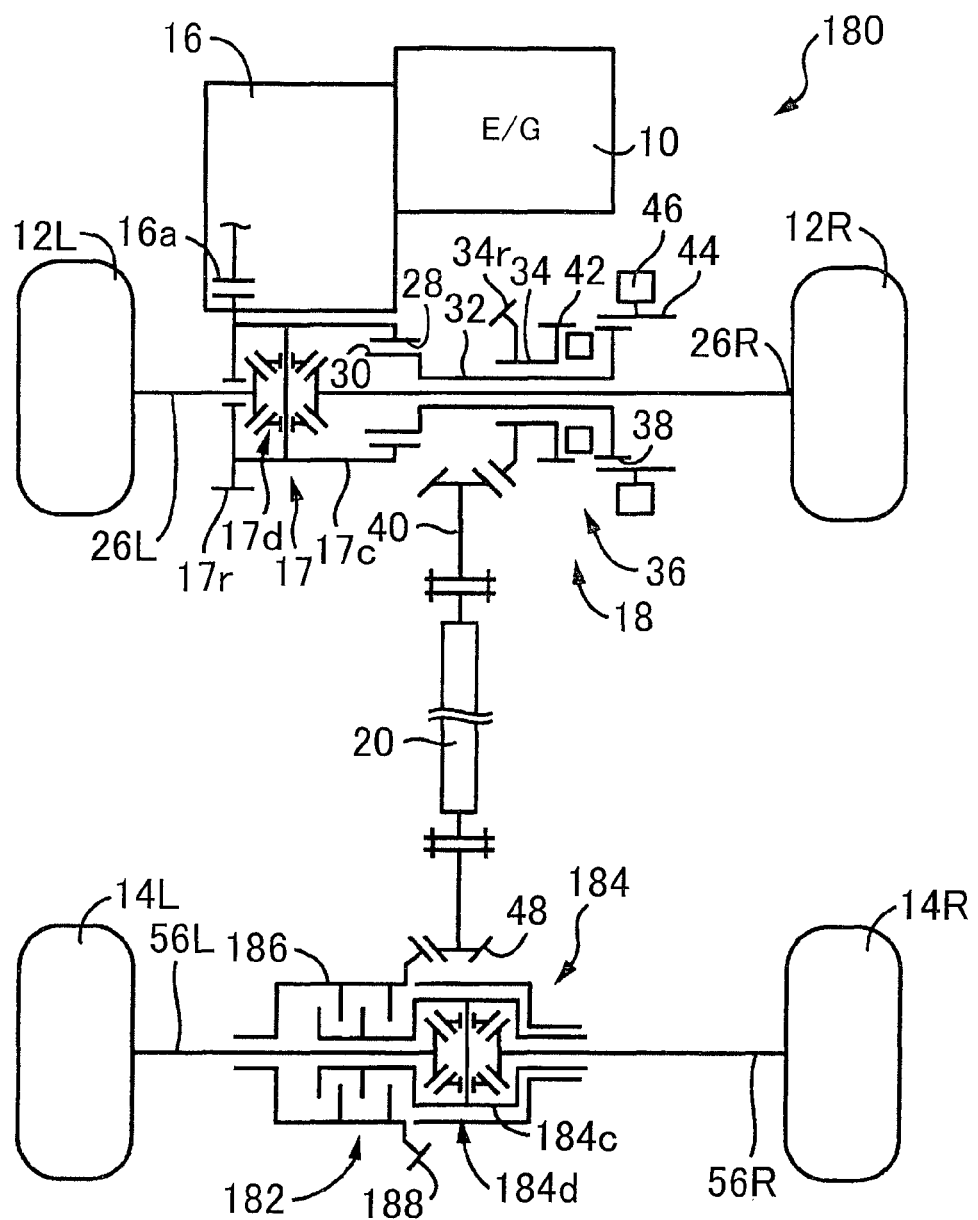
FIG. 9 is a skeleton view showing another aspect of the 4WD vehicle to which the invention can be applied.

FIG. 9 is a skeleton view of a 4WD vehicle 180 as another embodiment to which the invention can be applied. When the 4WD vehicle 180 in FIG. 9 is compared with the 4WD vehicle 8 in FIG. 1, the structure of the rear wheel side is different. Hereinbelow, the structure of the rear wheel side different from that of the 4WD vehicle 8 will be described.

The rear wheel side of the 4WD vehicle 180 includes a coupling 182 and a rear differential gear 184. The coupling 182 is provided between a power T/M member 186 to which the power is transmitted from the drive pinion 48 and the rear differential gear 184, and is an electronically controlled coupling configured by, e.g., a wet multi-plate clutch.

The power T/M member 186 has a substantially cylindrical shape, and is formed with a ring gear 188 engaged with the drive pinion 48. The rear differential gear 184 includes a case 184c and a differential mechanism 184d. One side of the case 184c in a rotation axis direction is extended, and the coupling 182 is provided between the extended portion and the power T/M member 186. The differential mechanism 184d is configured by a conventional bevel gear, and appropriately generates differential rotation in the left and right wheels according to the running state of the vehicle. Note that, since the differential mechanism 184d is a conventional technique, the description of its structure and operation will be omitted.

In the 4WD vehicle 180 configured as described above, when the clutch 36 is disengaged and the T/M torque of the coupling 182 is controlled to zero, the power T/M to the rotary elements (the second rotary member 34, the driven pinion 40, the propeller shaft 20, the drive pinion 48, and the power T/M member 186) constituting the power T/M path between the second rotary member 34 and the power T/M member 186 is interrupted, and the rotation thereof is stopped. That is, when the clutch 36 is disengaged and the T/M torque of the coupling 182 is controlled to zero, it becomes possible to perform the switching to the 2WD_d running. Consequently, since it becomes possible to perform the switching to the 2WD_d running also in the 4WD vehicle 180, the invention of the present application can be appropriately applied to the 4WD vehicle 180. Note that, in the present embodiment, the clutch 36 and the coupling 182 constitute the disconnect mechanism of the invention.

As described above, also in the 4WD vehicle 180 of the present embodiment, since it is possible to switch the running to the 2WD_d running in which the power T/M to the specific rotary element is interrupted and the rotation thereof is stopped, it is possible to obtain the same effects as those of the above-described embodiments by appropriately applying the invention to the present embodiment.

Although the embodiments of the invention have been described in detail based on the drawings thus far, the invention can be used in other modes.

For example, although the above-described embodiments are independent of each other, the embodiments may be appropriately combined and implemented as long as no contradiction arises.

In addition, in the above-described embodiments, although the coupling 24 or 182 is disposed side by side with the rear differential gear 22 or 184, the invention is not necessarily limited thereto and, for example, the coupling may be disposed between the propeller shaft 20 and the drive pinion 48. That is, as long as the 4WD vehicle is capable of switching the running to the 2WD_d running in which the power T/M to the specific rotary element is interrupted and the rotation thereof is stopped, the invention can be appropriately applied to the 4WD vehicle.

Further, in the above-described embodiments, in the case where it is difficult to increase the E/G torque Te, although the notification lamp 122 is turned on or the notification sound is generated in addition to the alternative control (reduction in the rate of change of the T/M torque of the coupling and the shift-down of the automatic T/M 16) or the prohibition of the switching and tightening of the condition for the switching, the notification lamp 122 may not be necessarily turned on or the notification sound may not be necessarily generated.

Furthermore, in the above-described embodiments, although the automatic T/M 16 is the stepped automatic T/M configured by a plurality of the planetary gear trains and a plurality of the frictional engagement devices, the structure of the T/M is not necessarily limited thereto, and the T/M configured by a mating gear may also be used. Moreover, the T/M is not necessarily limited to the stepped T/M, the structure of the T/M may be appropriately changed, and a belt-type T/M may also be used.

Additionally, in the above-described embodiments, although the clutch 36 is the dog clutch, the clutch is not limited thereto, and any clutch capable of appropriately connecting or disconnecting the rotary elements to or from each other can be appropriately used. In addition, the clutch may be further provided with a synchronization mechanism.

Further, in the above-described embodiments, although the 4WD vehicle 8 or 180 has the structure in which the power is constantly transmitted to the front wheel side, the structure is not necessarily limited to the structure in which the power is constantly transmitted to the front wheel side, and a structure may also be adopted in which the power is constantly transmitted to the rear wheel side and the power is selectively transmitted to the front wheel side. Furthermore, the coupling 24 or 182 may be appropriately changed as long as the coupling 24 or 182 is capable of controlling the T/M torque.

Moreover, in the above-described embodiments, although the 4WD-ECU, the E/G-ECU, and the T/M-ECU are individually provided as the ECU 80, these ECUs may be configured by one ECU.

In addition, in the above-described embodiments, although the power T/M to each rotary element is interrupted and the rotation thereof is stopped during the 2WD_d running, the rotation of the rotary element may not be completely stopped, and the rotary member may rotate slightly.

Note that the above-described embodiments are only exemplary embodiments, and the invention may be implemented in modes employing various modifications and improvements based on what a person skilled in the art learned.

What is claimed is:

1. A control system for a four-wheel drive vehicle, the control system comprising:
    an engine;
    an auxiliary drive wheel to which power is transmitted from the engine during a four-wheel drive running of the four-wheel drive vehicle;
    a disconnect mechanism provided in a power transmission path between the engine and the auxiliary drive wheel, the disconnect mechanism configured to interrupt transmission of the power to a specific rotary element that transmits the power to the auxiliary drive wheel, so as to stop rotation of the specific rotary element; and
    an electronic control unit configured to:
    (a) cancel the interruption of the transmission of the power and increase a torque of the engine when the interruption is canceled during a two-wheel drive running in which the disconnect mechanism interrupts the transmission of the power,
    (b) determine whether the torque of the engine is able to be increased, and
    (c) suppress a fluctuation in a driving force of the four-wheel drive vehicle occurring during the cancellation of the interruption when the electronic control unit determines that the torque of the engine is unable to be increased.

2. The control system according to claim 1, wherein the electronic control unit is configured to extend a time period in which a speed of the specific rotary element is increased.

3. The control system according to claim 1, further comprising:
    an automatic transmission provided in the power transmission path between the engine and the disconnect mechanism,
    wherein the electronic control unit is configured to change a speed ratio of the automatic transmission such that the driving force is increased.

4. The control system according to claim 2, wherein a mechanism configured to increase the speed of the specific rotary element is a clutch configured to control a torque transmitted to the auxiliary drive wheel.

5. The control system according to claim 1, wherein the electronic control unit is configured to prohibit the interruption when the electronic control unit determines that the torque of the engine is unable to be increased.

6. The control system according to claim 1, wherein the electronic control unit is configured to restrict a condition for the interruption when the electronic control unit determines that the torque of the engine is unable to be increased.

7. The control system according to claim 1, wherein the electronic control unit is configured to prohibit the cancellation of the interruption when the electronic control unit determines that the torque of the engine is unable to be increased and when the interruption is executed.

8. The control system according to claim 1, wherein the electronic control unit is configured to restrict a condition for the cancellation of the interruption when the electronic control unit determines that the torque of the engine is unable to be increased and when the interruption is executed.

9. The control system according to claim 1, wherein the electronic control unit includes a mechanism configured to notify a driver that the fluctuation in the driving force of the four-wheel drive vehicle occurring during the cancellation of the interruption is suppressed when the electronic control unit determines that the torque of the engine is unable to be increased.

10. The control system according to claim 1, wherein the electronic control unit includes a mechanism configured to notify a driver that the fluctuation in the driving force of the four-wheel drive vehicle occurring during the cancellation of the interruption has been suppressed when the electronic control unit determines that the torque of the engine is unable to be increased.

* * * * *